United States Patent
Yamaguchi et al.

(10) Patent No.: US 7,605,909 B2
(45) Date of Patent: Oct. 20, 2009

(54) DETECTION DEVICE FOR DETECTING CONDITIONS AT A TARGET POSITION

(75) Inventors: Atsushi Yamaguchi, Mizuho (JP); Yoshihisa Suzuki, Ichinomiya (JP); Masato Yamada, Inuyama (JP); Shuichi Ichiura, Hashima (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/405,450

(22) Filed: Apr. 18, 2006

(65) Prior Publication Data

US 2006/0265147 A1  Nov. 23, 2006

(30) Foreign Application Priority Data

Apr. 28, 2005  (JP)  ............................. 2005-132945

(51) Int. Cl.
*G01C 3/08* (2006.01)

(52) U.S. Cl. ..................................... 356/5.01; 356/5.04

(58) Field of Classification Search ................ 356/5.11, 356/3.09, 5.01

See application file for complete search history.

(56) References Cited

U.S. PATENT DOCUMENTS

| | | | | |
|---|---|---|---|---|
| 2,582,728 | A * | 1/1952 | Walker ....................... | 356/3.05 |
| 6,094,270 | A * | 7/2000 | Uomori et al. .............. | 356/623 |
| 6,862,527 | B2 * | 3/2005 | Okamura et al. ............ | 701/301 |
| 2003/0218919 | A1* | 11/2003 | Arita et al. ................... | 365/200 |
| 2004/0112881 | A1* | 6/2004 | Bloemeke et al. ...... | 219/121.71 |
| 2005/0061957 | A1* | 3/2005 | Kase ............................ | 250/221 |
| 2006/0055587 | A1* | 3/2006 | Mitsumoto ................... | 342/70 |

FOREIGN PATENT DOCUMENTS

| | | |
|---|---|---|
| JP | 57-014763 | 1/1982 |
| JP | 07-027859 | 1/1995 |
| JP | 07-229967 | 8/1995 |
| JP | 09-318748 | 12/1997 |
| JP | 10-38511 A | 2/1998 |
| JP | 2005-106603 | 4/2005 |

OTHER PUBLICATIONS

Japanese Notification of Reasons for Refusal, with an English translation thereof, issued in Patent Application No. 2005-132945 dated on Aug. 19, 2008.

* cited by examiner

*Primary Examiner*—Thomas H Tarcza
*Assistant Examiner*—Timothy A Brainard
(74) *Attorney, Agent, or Firm*—McDermott Will & Emery LLP (57) ABSTRACT

An object of the present invention is to provide a detection device which does not cause the false detection by receiving laser light from an oncoming car.

The pulse laser light modulated with a modulation pattern set every target position is irradiated at the target position from a laser irradiation portion. DSP (Digital Signal Processor) decides that there is an obstacle at the target position only when the modulation pattern of the pulse laser light emitted from the laser emitting portion matches with the modulation pattern of the pulse laser light received by the laser receiving portion. It is suppressed that the detection device misdetects the conditions of the target position when receiving laser light from an oncoming car or the like because modulation pattern of laser light from own does not match with modulation pattern of laser light from the oncoming car or the like.

8 Claims, 7 Drawing Sheets

SCAN TRAGECTORY EXAMPLE

Fig. 5A

BEAM ERRADIATION

MODULATION PATTERN EXAMPLE

*Fig. 7B*

MODULATION PATTERN EXAMPLE

*Fig. 7C*

MODULATION PATTERN EXAMPLE

DETECTION DEVICE FOR DETECTING CONDITIONS AT A TARGET POSITION

BACKGROUND OF THE INVENTION

1. Field of the Invention

The present invention relates to a detection device for detecting conditions at a target position by irradiating a laser light to the target position.

2. Description of the Related Art

In recent years, in order to improve driving safety, a detection device for detecting an obstacle ahead in a driving direction of a vehicle or the like by emitting a laser light to a target region is mounted, for example, on a family vehicle. The detection device scans a scan surface with a laser light to detect the presence or absence of the obstacle within the scan surface based on the presence or absence of a reflection beam of the laser light. The detection device emits pulse lights at each scan position (target position) to detect the presence or absence of the obstacle at the scan position. At the same time, the distance to the obstacle is measured based on the interval from pulse light emitting timing to pulse light receiving timing.

JP 10-38511 A describes a technique for adjusting the power of the laser light emitted from the detection device based on the power of the laser light received from the target region.

When this kind detection device is mounted, for example, on family vehicles, it may occur that, at the timing when the detection device mounted on a family vehicle emits the laser light to the target position, a detection device mounted on an oncoming family vehicle emits the laser light, which light is received by the photo detector in the detection device mounted on the vehicle. In this case, the detection device causes the false detection, and, depending on it, there is the case that non-desired driving control hangs over to the vehicle. These problems come to be frequent in future as the vehicles which mount this kind of detecting device increase.

SUMMARY OF THE INVENTION

An object of the present invention is to provide a detection device which does not cause the false detection by receiving laser light from an oncoming car.

A first aspect of the present invention is characterized by a detection device for detecting conditions at a target position by irradiating a laser light to the target position, including: irradiation means for irradiating the laser light to the target position; light reception means for receiving a laser light from the target position; modulation means for modulating the laser light irradiated from the irradiation means; distinction means for distinguishing whether a modulation state of the laser light irradiated from the irradiation means matches with a modulation state of the laser light received by the light reception means; detection means for detecting conditions of the target position based on a light reception state in the light reception means when the distinction means distinguishes that the modulation state of the laser light irradiated from the irradiation means matches with the modulation state of the laser light received by the light reception means.

A second aspect of the present invention is characterized by the detection device according to first aspect of present invention, further including: means for adjusting an irradiation direction of the laser light from the irradiation means so as to change the target position irradiated by the laser light; wherein the modulation means sets a modulation pattern of the laser light every target position.

In the second aspect of the present invention, the modulation means can be constructed as follows.

(a) The modulation means changes the number of times of irradiation of the laser light every shift of the target position.

(b) The modulation means changes a period of irradiation of the laser light every shift of the target position.

(c) The modulation means irradiates multiple times the laser light at the target position and changes irradiation strength of the laser light of each time, according to a modulation rule, every shift of the target position.

(d) The modulation means modulates the laser light such that the laser light irradiated to the target position is distinguishable with a state of a group of laser pulses and changes the state of the group of the laser pulses every shift of the target position.

According to the detection device according to each aspect the above, conditions of a target position is detected only when a modulation state of laser light irradiated from the irradiation means is matches with a modulation state of laser light received by the reception means. Therefore, it is suppressed that the detection device misdetects conditions of the target position when receiving laser light from other moving body (an oncoming car or the like). In this case, probability that the modulation state of laser light irradiated from own is matches with the modulation state of laser light from other moving body is suppressed more by increasing kinds of modulation pattern. Furthermore, possibility to have such matching is more suppressed by setting the modulation pattern of laser light every target position like as the second aspect of present invention.

In addition, a modulation pattern of laser light can be set like as (a) through (d) above. Misdetection is suppressed effectively by distinguishing laser light with a group of laser pulses like as (d). Furthermore, laser light form own is distinguished from laser light emitted from other detection device clearly by changing contents of the laser pulse group every detector. In this case, the false detection by receiving laser light from other movement body cannot happen at all theoretically.

An abnormality method shown in (a), (b), (c) and (d) is exemplified to FIG. 4B, FIG. 7A, FIG. 7C and FIG. 7B in the following embodiment respectively.

It should be noted, however, that the following embodiment is one example of an embodiment form of this invention and meanings of terms of the invention and components are not limited to the embodiment.

BRIEF DESCRIPTION OF THE DRAWINGS

The above-mentioned and other objects of the present invention and the novel features thereof will be completely more clear when the following descriptions of embodiments are read with reference to the accompanying drawings.

Note that the drawings are exclusively for the descriptions and thus a scope of the present invention is not limited thereby.

DETAILED DESCRIPTION OF THE PREFERRED EMBODIMENT

Figure 1:
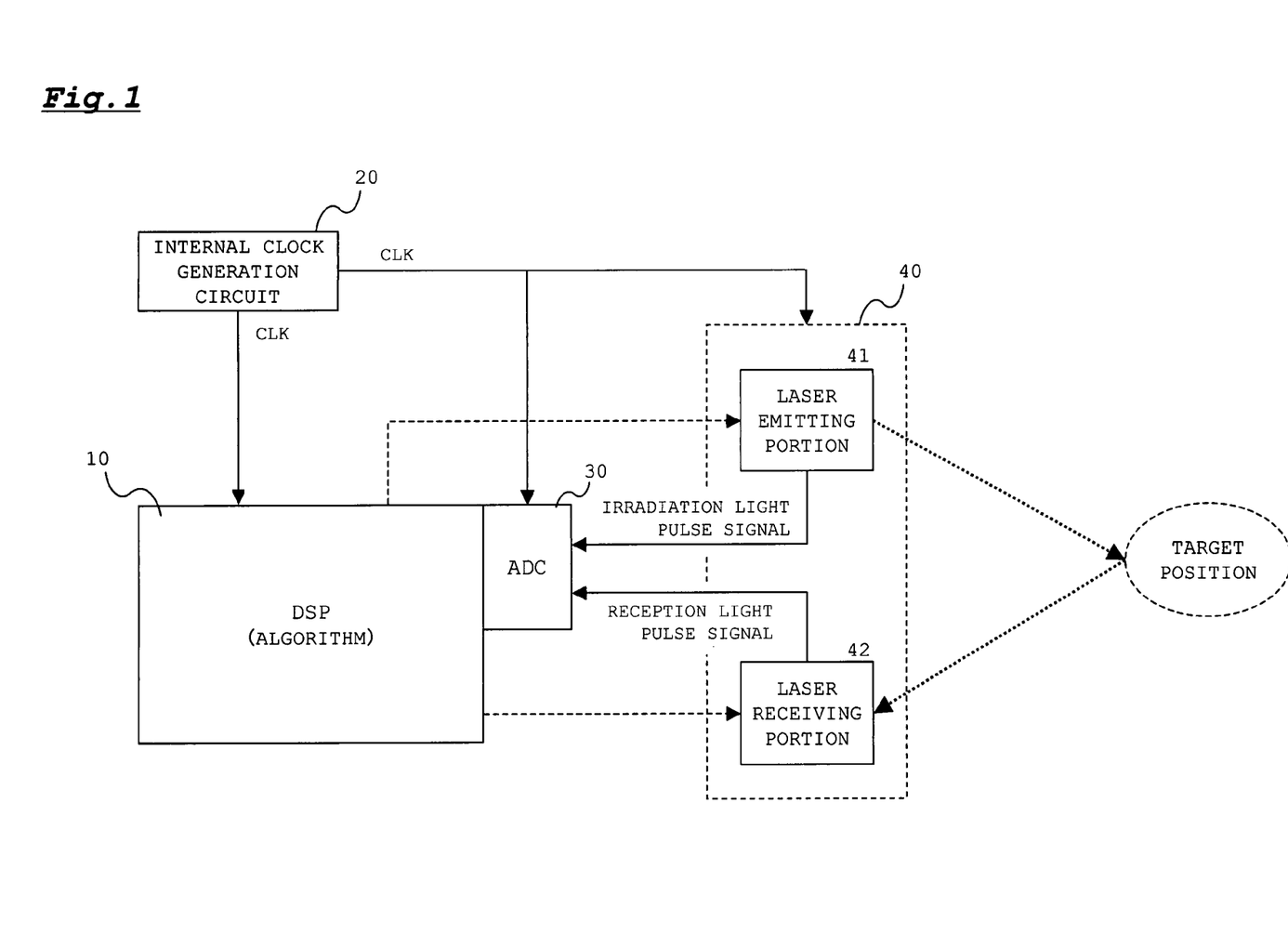
FIG. 1 shows a configuration of a detection device according to an embodiment of the present invention.

FIG. 1 shows the configuration of a detection device according to an embodiment of the present invention.

A beam detection device according to the embodiment is provided with a digital signal processor (DSP) 10, an internal clock generation circuit 20, an analog digital converter (ADC) 30, a beam irradiation device 40.

The DSP 10 processes irradiation light pulse signals and reception light pulse signals input from a laser emitting portion 41 and a laser receiving portion 42 thorough the ADC 30 to detect the presence or absence of the obstacle at the target position. Also, the DSP 10 counts interval from pulse light emitting timing to pulse light receiving timing referring these signals to measure the distance to the obstacle based on the interval. The processing executed by the DSP 10 will be described later in detail with referring FIG. 6.

The internal clock generation circuit 20 generates an internal clock of a high frequency and outputs it to the DSP 10, the ADC 30 and the beam irradiation device 40. The ADC converts the irradiation light pulse signals and the reception light pulse signals input from the laser emitting portion 41 and the laser receiving portion 42 to digital signals and outputs the digital signals to the DSP 10.

The beam irradiation device 40 has the laser emitting portion 41 and the laser receiving portion 42. The beam irradiation device 40 emits pulse laser light toward a target position through the laser emitting portion 41 and receives the pulse laser light reflected from the target position with the laser receiving portion 42.

The laser emitting portion 41 holds several kinds of modulation patterns to modulate laser light to pulse laser light. The laser emitting portion 41 outputs pulse laser light at any time while changing a modulation pattern every target position. The laser emitting portion 41 outputs a wave pattern signal of the pulse laser light output toward the target position to ADC30 as the irradiation light pulse signal.

The laser receiving portion 42 receives the laser light from the target portion to output a wave pattern signal according to the intensity of light reception to ADC 30 as the reception light pulse signal.

Figure 2:
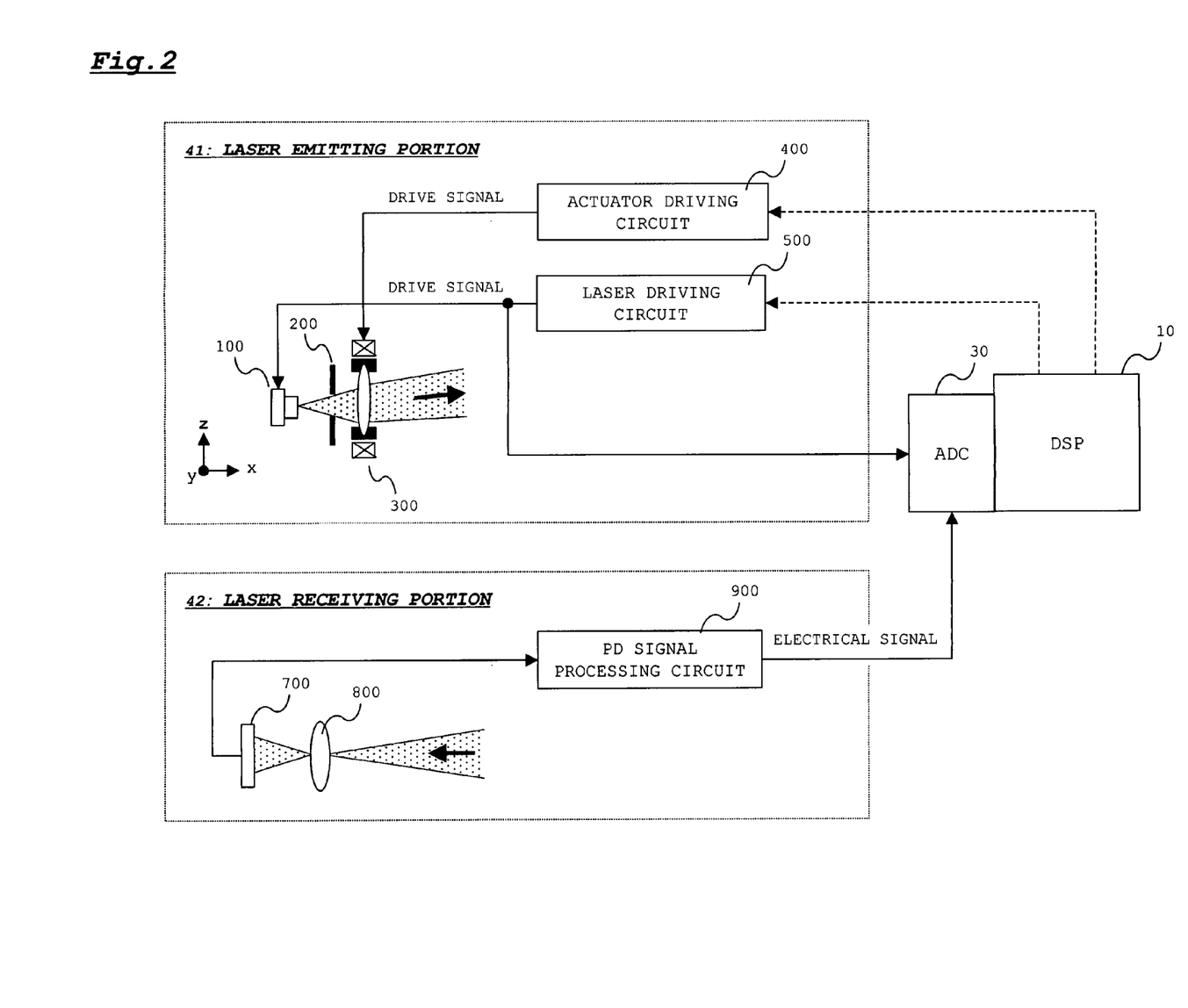
FIG. 2 shows configurations of a laser emitting portion 41 and a laser receiving portion 42 according to an embodiment of the present invention.

FIG. 2 shows configurations of the laser emitting portion 41 and the laser receiving portion 42.

The laser emitting portion 41 is provided with a semiconductor laser 100, an aperture 200, a lens actuator 300, an actuator driving circuit 400 and a laser driving circuit 500.

Laser light emitted from the semiconductor laser 100 is shaped into a desired shape by the aperture 200 and then allowed to impinge on an irradiation lens supported by the lens actuator 300. The irradiation lens is supported by the lens actuator 300 so as to be displaceable in the direction of a y-z plane of FIG. 2. Therefore, the laser light that has passed through the irradiation lens changes in outgoing angle in the direction of the y-z plane as the lens actuator 300 is driven, by which, irradiation position of the laser light changes on a predetermined scan trajectory. Thus, a laser light scan on the target region is performed. That is, the target position that should irradiate laser light is changed sequentially.

The actuator driving circuit 400 drives a lens actuator 300 in accordance with the control signal inputted from the DAC 10. The laser driving circuit 500 drives a semiconductor laser 100 in accordance with the control signal inputted from the DSP 10. As described above, the drive signal from the laser driving circuit 500 is input in the ADC 30 as the irradiation light pulse signal.

The laser receiving circuit 42 is provided with a photo detector 700, a receiving lens and a photo detector (PD) signal processing circuit 900.

When an obstacle exists at a target position, the laser light emitted from laser emitting portion 41 is reflected by the obstacle, the reflection light is received by the photo detector 700 through the receiving lens 800. The photo detector 700 outputs the electrical signal according to the amount of light reception to the PD signal processing circuit 900. The PD signal processing circuit 900 amplifies and cancels noise from the electrical signal inputted from the photo detector 700 and outputs the produced electrical signal to the ADC 30.

Figure 3:
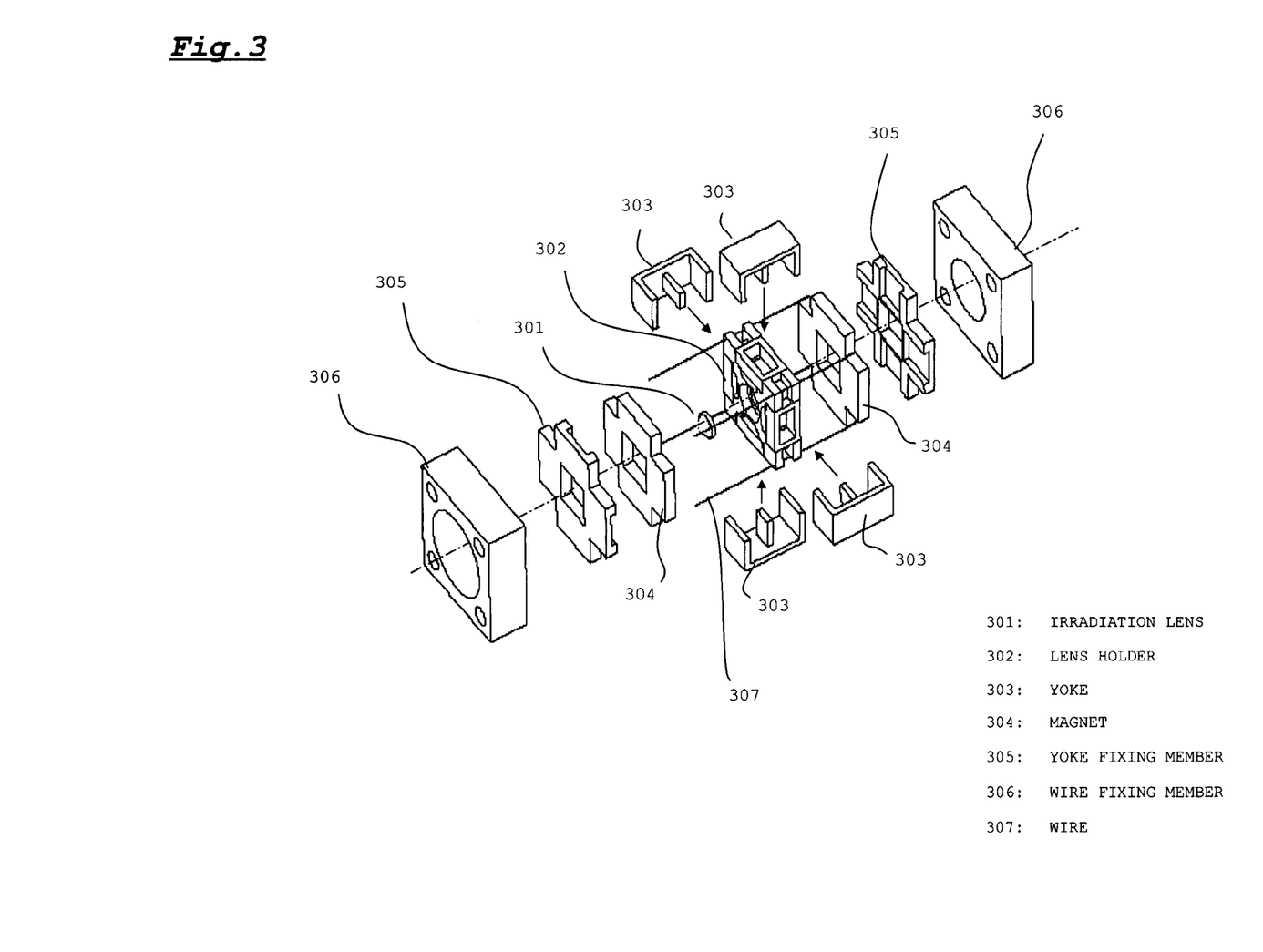
FIG. 3 shows a construction of the lens actuator 300 (an exploded perspective view) according to an embodiment of the present invention.

FIG. 3 shows the construction of the lens actuator 300 (an exploded perspective view).

Referring to FIG. 3, an irradiation lens 301 is fitted in a central opening of a lens holder 302. Coils are fitted on four lateral faces of the lens holder 302, respectively. Central protruding portions of yokes 303 are inserted into the coils respectively as indicated by arrows shown in FIG. 2. Tongue strips of each of the yokes 303 on both sides are fittingly inserted into corresponding depressed portions of a pair of yoke fixing members 305. In addition, magnets 304 are secured to the yoke fixing members 305 respectively such that the tongue strips of the yokes 303 are sandwiched therebetween. In this state, the yoke fixing members 305 accompanied with the magnets 304 are mounted on a base (not shown).

Moreover, a pair of wire fixing members 306 is mounted on the base. The lens holder 302 is resiliently supported by the wire fixing member 306 via wires 307. Holes for fittingly inserting the wires 307 therethrough are formed through the lens holder 302 at its four corners. After the wires 307 have been fittingly inserted through the holes, respectively, both ends of each of the wires 307 are secured to the wire fixing members 306, respectively. Thus, the lens holder 302 is resiliently supported by the wire fixing members 306 via the wires 307.

At the time of driving, drive signals are supplied from the actuator driving circuit 40 to the respective coils fitted to the lens holder 302. Thus, an electromagnetic driving force is generated, so the irradiation lens 301 is two-dimensionally driven together with the lens holder 302.

Figure 4A:
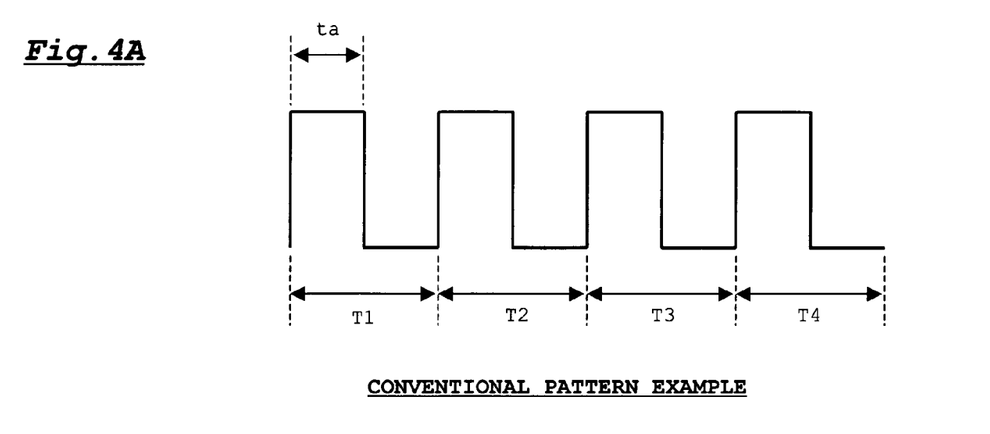
FIG. 4A shows an example of a modulation pattern according to a convention model.
Figure 4B:
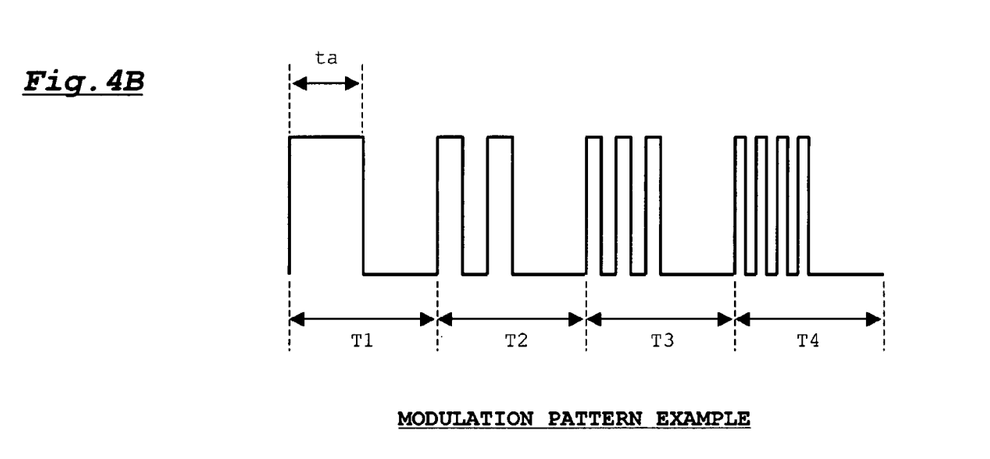
FIG. 4B shows the example of the modulation pattern according to an embodiment of the present invention.

FIG. 4B shows an example of modulation patterns for the pulse laser light which are held in the laser emitting portion. FIG. 4B shows an example of an output pattern for the pulse laser light (for convention models) which is used when the pulse laser light is not modulated.

As shown in FIG. 4B, in this embodiment, four modulation patterns shown each for a period of T1, T2, T3 and T4 are prepared. Of these, by the modulation pattern shown for a period of T1, only one pulse laser light having width in time of ta is output. By the modulation patterns shown for a period of T2, T3 and T4, pulse laser light of 2, 3 and 4 is output between width in time of ta in each period.

Figure 5A:
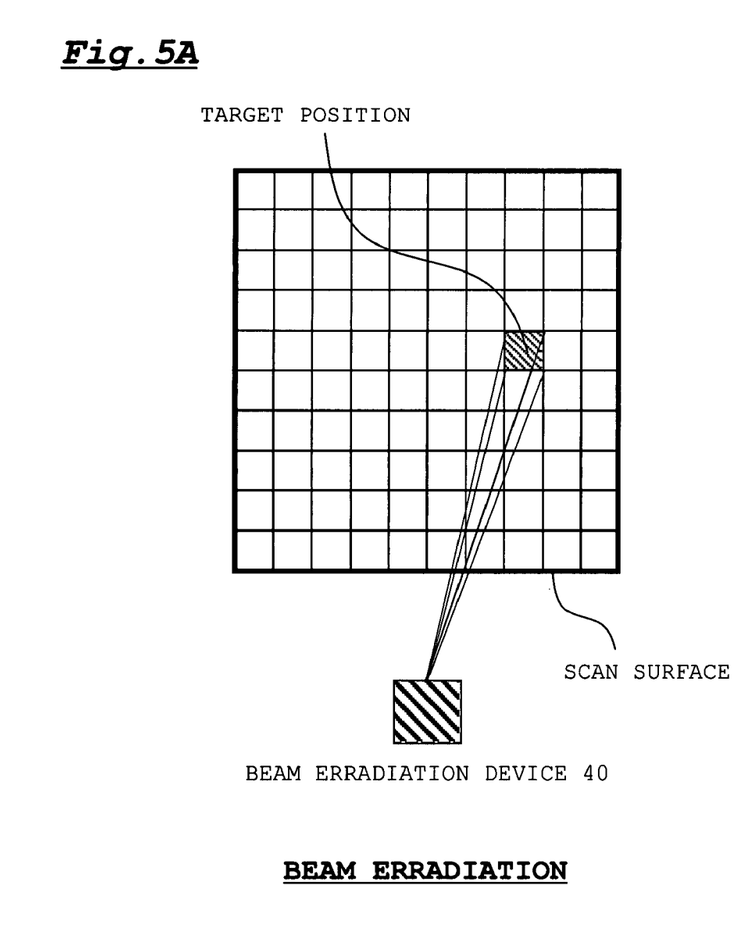
FIGS. 5A and 5B are explanatory views showing scan operation according to the embodiment of the present invention.
Figure 5B:
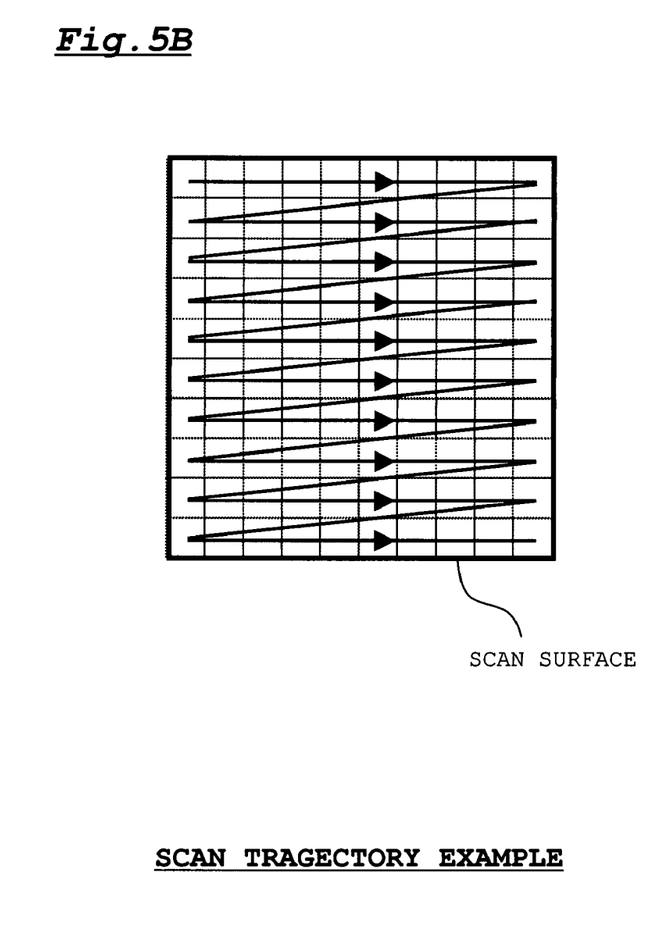

When scanning with laser light in a scan surface as shown in FIGS. 5A, 5B, for example, the laser emitting portion 41 sets the modulation pattern of pulse laser light every target position arranged in the shape of a matrix in the scan area. For example, when scan is performed as shown in FIG. 5B, a modulation pattern shown for four periods of T1, T2, T3 and T4 of FIG. 4B is set with this turn for each target position appearing in scan order from a target position at the upper-left corner position by cyclic. Replacing with this, a modulation pattern chosen among four modulation patterns at random may be set for each target position.

The laser emitting portion 41 outputs pulse laser light while in this way changing a modulation pattern every target position. At the same time, the laser emitting portion 41 outputs wave pattern signal according to the pulse laser light output to ADC 30 as the irradiation light pulse signal.

The DSP 10 distinguishes whether the modulation pattern of the pulse laser light emitted by the laser emitting portion 41 matches with the modulation pattern of the pulse laser light received by the laser receiving portion 42 based on the irradiation light pulse signal input from the laser emitting portion 41 through the ADC 30 and the reception light pulse signal input from the laser receiving portion 42 through ADC 30. When the modulation pattern of the pulse laser light emitted matches with the modulation pattern of the pulse laser light received, the DSP 10 detects an obstacle existing in the target position, counts time interval between irradiation timing of the pulse laser light and reception timing of the pulse laser light and calculates distance to the obstacle based on the time interval.

Figure 6:
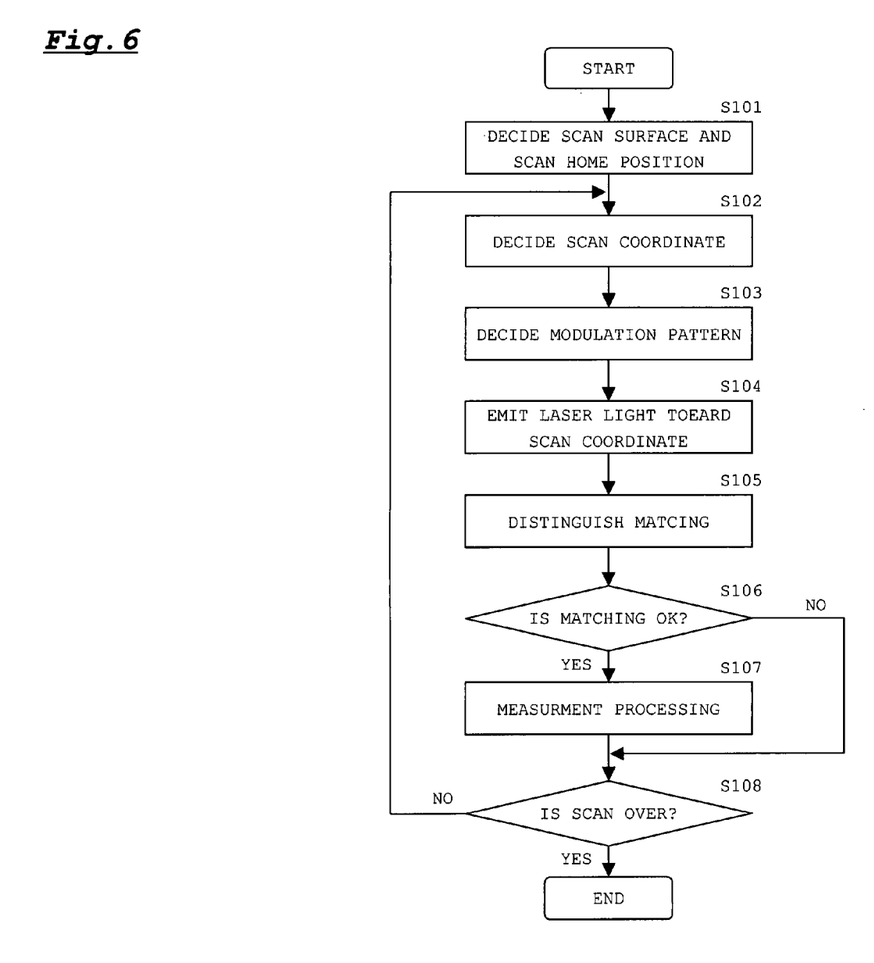
FIG. 6 is a flowchart for the scan operation according to the embodiment of the present invention.

FIG. 6 shows a flowchart in performing the scan operation.

When the scan operation is started, a scan surface and a home position of the scan surface are decided (S101), and then a scan coordinate (a target position) on the scan surface is decided (S102). Next, from four modulation patterns above, the modulation pattern that should be set for this scan coordinate is decided (S103), the pulse laser light modulated with the modulation pattern decided emitted toward the scan coordinate (S104). After that, the laser receiving portion 42 waits with a receipt of pulse laser light after the emission of laser light for a certain period of time. When receiving the pulse laser light, the laser receiving portion 42 judges whether the modulation pattern of the pulse laser light received matches with the modulation pattern decided in the Step S103 (S105).

In this judgment, when both patterns are matching each other (S106: YES), it is detected that an obstacle exists at the scan coordinate (target position), and distance to the obstacle is calculated based on time interval between irradiation timing of the pulse laser light and reception timing of the pulse laser light matched with the irradiated pulse laser light in the modulation pattern (s107).

On the other hand, when the laser receiving portion 42 does not receive pulse laser light for the time period above or modulation pattern of laser light which received by the laser receiving portion 42 does not match with the modulation pattern decided in the Step S103 (S106: NO), it is detected that no obstacle exists at the scan coordinate (target position), and measurement processing in the Step S107 is skipped.

When processing for this scan position is over, it is distinguished whether there is any other position to be scanned (S108). When there is the position to be scanned, processing returns to the Step S102, and then, processing for the next scan coordinate (the target position) is performed same as the above. Processing from the Step S102 to the Step S107 is repeated till processing for all scan positions is finished. When processing has been performed for all scan positions (S108: YES), the scan operation for the scan surface is finished.

According to the embodiment, only when the modulation pattern of the pulse laser light emitted from the laser emitting portion 41 matches with the modulation pattern of the pulse laser light received by the laser receiving portion 42, it is decided that there is an obstacle at the target position, and distance to the obstacle is measured. Therefore, it is suppressed that the detection device misdetects the situation of the target position when receiving laser light from an oncoming car or the like. In this case, probability of the false detection is suppressed more by increasing kinds of modulation pattern shown in FIG. 4B more.

Figure 7A:
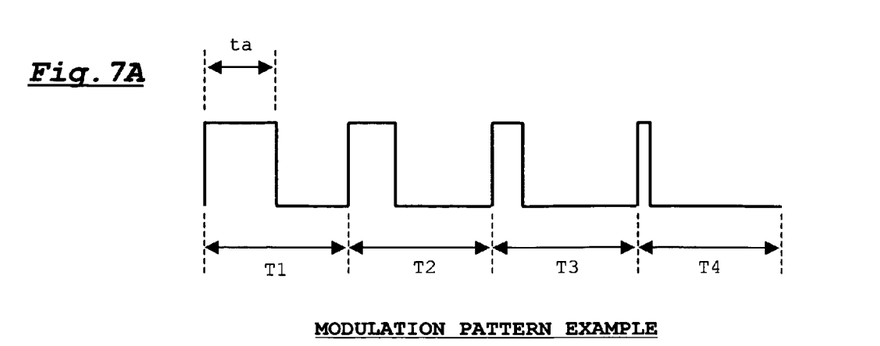
FIGS. 7A to 7C show examples of a modulation pattern according to the embodiment of the present invention.
Figure 7B:
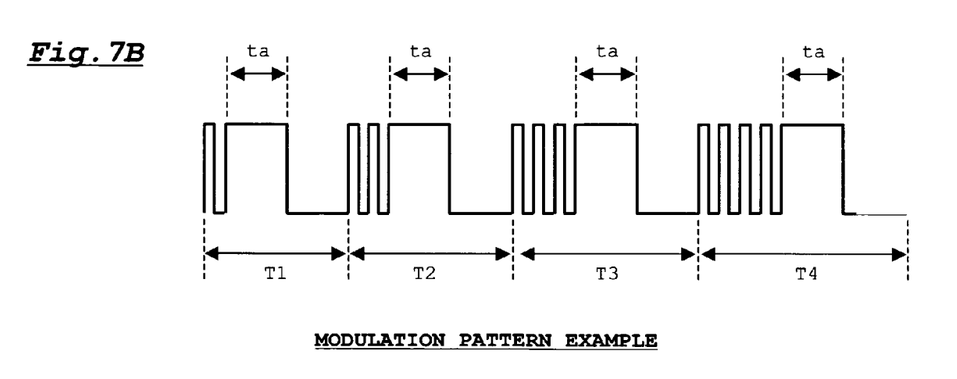
Figure 7C:
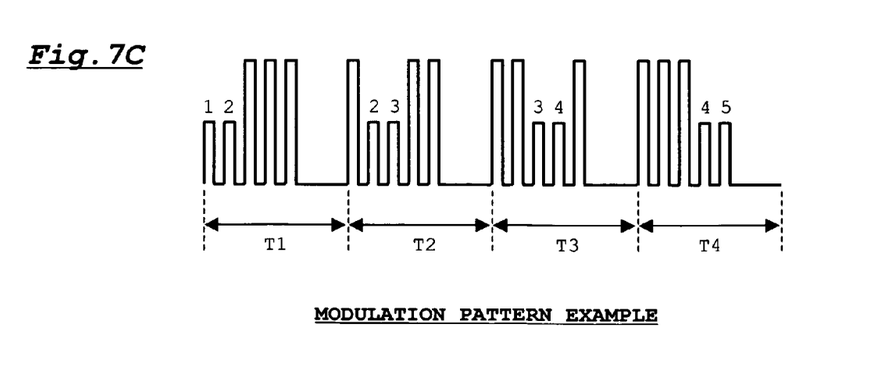

Still, modulation patterns as shown in FIGS. 7A, 7B and 7c may be used instead of modulation patterns shown in FIG. 4B.

FIG. 7A shows a modulation pattern example that width in time of a pulse is changed into four phases.

FIG. 7B shows a modulation pattern example that pulse group to distinguish pulse laser light is added to before a pulse of width ta in time. In FIG. 7B, pulse group comprising pulses of one, two, three and four is added for each period of T1, T2, T3 and T4. That is, pulse laser light is distinguished by the number of pulses included in the pulse group. Although T1, T2, T3 and T4 are set as T1<T2<T3<T4 in the example shown in FIG. 7B, these periods may be set as T1=T2=T3=T4 by adjusting a period behind a pulse of width ta in time.

FIG. 7C shows a modulation pattern example that a level of two pulses is set lower than a level of three other pulses and a placement position of these two pulses is changed every modulation pattern of T1, T2, T3 and T4.

Pulse group may hold a predetermined identification cord by changing time-length of a pulse period and a non-pulse period of pulse group, like as bar code. In this case, detection device can distinguish pulse laser light of own from pulse laser light output from other detection device definitely by giving the pulse group of own the identification cord which is peculiar to own. In this case, the detection device does not misdetect the situation of the target position even when receiving laser light from an oncoming car or the like.

Although a modulation pattern is set every target position in the above embodiment, a modulation pattern for a target position may be changed every scan period set beforehand. For example, a modulation pattern for a target position may be changed every one line in FIG. 5B. Alternatively, a modulation pattern for a target position may be changed every scan surface. In this case, however, probability that the modulation pattern of the pulse laser light of own matches with the modulation pattern of the pulse laser light from an oncoming car or the like goes up compared with the case to change the modulation pattern every shift of a target position like as the above embodiment, by which, the probability that the false detection occurs increases.

In the above-mentioned embodiment, the present invention is applied to the detection device for vehicle. The present invention can be applied to a detection device for moving object such as ship or airplane.

The embodiment of the present invention can be variously modified as appropriate without departing from the scope of technical idea described in the claims.

What is claimed is:

1. A detection device for detecting conditions at a target position by irradiating a laser light to the target position, comprising:

irradiation means for irradiating the laser light having a unique modulation pattern to the target position;

light reception means for receiving a laser light from the target position;

modulation means for modulating the laser light irradiated from the irradiation means, wherein a modulation pattern of the laser light irradiated from the irradiation means is chosen among a plurality of different modulation pattern;

distinction means for distinguishing whether the modulation pattern of the laser light irradiated from the irradiation means matches with a modulation pattern of the laser light received by the light reception means, whereby identifying the laser light received by the light reception means is the laser light that is irradiated from the irradiation means and reflected by an object at the target position when the modulation pattern of the laser light received by the light reception means is the unique modulation pattern of the light irradiated to the target position;

detection means for detecting conditions of the target position based on a light reception state in the light reception means when the modulation pattern of the laser light irradiated from the irradiation means matches with the modulation pattern of the laser light received by the light reception means; and means for adjusting an irradiation direction of the laser light from the irradiation means so as to change the target position irradiated by the laser light, wherein the modulation means sets a modulation pattern of the laser light for every target position, wherein the detection device is mounted on a moving vehicle such that conditions of a moving object at the target position are detected, and wherein the modulation means modulates the laser light such that the laser light irradiated to the target position is distinguishable with a state of a group of laser pulses and changes the state of the group of the laser pulses every shift of the target position.

2. The detection device according to claim 1, wherein the modulation means changes the number of times of irradiation of the laser light every shift of the target position.

3. The detection device according to claim 1, wherein the modulation means changes a period of irradiation of the laser light every shift of the target position.

4. The detection device according to claim 1, wherein the modulation means irradiates multiple times the laser light at the target position and changes irradiation strength of the laser light of each time, according to a modulation rule, every shift of the target position.

5. A detection device for detecting conditions at a target position by irradiating a laser light to the target position, comprising:

an irradiation portion for irradiating the laser light having a unique modulation pattern to the target position;

a light reception portion for receiving a laser light from the target position;

a modulation circuit for modulating the laser light irradiated from the irradiation portion, wherein a modulation pattern of the laser light irradiated from the irradiation portion is chosen among a plurality of different modulation patterns;

a distinction circuit for distinguishing whether a modulation pattern of the laser light irradiated from the irradiation portion matches with a modulation pattern of the laser light received by the light reception portion, whereby identifying the laser light received by the light reception portion is the laser light that is irradiated from the irradiation portion and reflected by an object at the target position when the modulation pattern of the laser light received by the light reception portion is the unique modulation pattern of the light irradiated to the target position;

a detection circuit for detecting conditions of the target position based on a light reception state in the light reception portion when the modulation pattern of the laser light irradiated from the irradiation portion matches with the modulation pattern of the laser light received by the light reception portion; and an actuator for adjusting an irradiation direction of the laser light from the irradiation means so as to change the target position irradiated by the laser light; and an actuator drive circuit for driving the actuator;

wherein the modulation circuit sets a modulation pattern of the laser light for every target position, wherein the detection device is mounted on a moving vehicle such that conditions of a moving object at the target position are detected, and wherein the modulation circuit modulates the laser light such that the laser light irradiated to the target position is distinguishable with a state of a group of laser pulses and changes the state of the group of the laser pulses every shift of the target position.

6. The detection device according to claim 5, wherein the modulation circuit changes the number of times of irradiation of the laser light every shift of the target position.

7. The detection device according to claim 5, wherein the modulation circuit changes a period of irradiation of the laser light every shift of the target position.

8. The detection device according to claim 5, wherein the modulation circuit irradiates multiple times the laser light at the target position and changes irradiation strength of the laser light of each time, according to a modulation rule, every shift of the target position.

* * * * *